US012322348B2

(12) United States Patent
Gohardehi et al.

(10) Patent No.: US 12,322,348 B2
(45) Date of Patent: Jun. 3, 2025

(54) LOW-POWER ACTIVE MATRIX DISPLAY WITH ROW AND/OR DATA DRIVER ENERGY RECYCLING TECHNIQUES

(71) Applicants: Sheida Gohardehi, Waterloo (CA); Manoj Sachdev, Waterloo (CA)

(72) Inventors: Sheida Gohardehi, Waterloo (CA); Manoj Sachdev, Waterloo (CA)

( * ) Notice: Subject to any disclaimer, the term of this patent is extended or adjusted under 35 U.S.C. 154(b) by 0 days.

(21) Appl. No.: 18/385,570

(22) Filed: Oct. 31, 2023

(65) Prior Publication Data

US 2024/0144887 A1 May 2, 2024

Related U.S. Application Data

(60) Provisional application No. 63/421,701, filed on Nov. 2, 2022.

(51) Int. Cl.
*G09G 3/3275* (2016.01)

(52) U.S. Cl.
CPC ... *G09G 3/3275* (2013.01); *G09G 2300/0852* (2013.01); *G09G 2310/08* (2013.01); *G09G 2330/023* (2013.01)

(58) Field of Classification Search
None
See application file for complete search history.

(56) References Cited

U.S. PATENT DOCUMENTS

2014/0225877 A1* 8/2014 Nakanishi ............ G09G 3/3677 345/204
2014/0246989 A1* 9/2014 Wu ...................... G09G 3/3655 315/240

FOREIGN PATENT DOCUMENTS

CN 112669781 A * 4/2021

OTHER PUBLICATIONS

Kim, et al., A Multi-Level Multi-Phase Charge-Recycling Method for Low-Power AMLCD Column Drivers, Jan. 2000, IEEE Journal of Solid-State Circuits, vol. 35, No. 1, pp. 7-8 (Year: 2000).*

* cited by examiner

*Primary Examiner* — Kirk W Hermann
(74) *Attorney, Agent, or Firm* — Gowling WLG (Canada) LLP

(57) ABSTRACT

Energy and/or power recycling techniques for use with portable displays in order to extend battery life for portable displays.

5 Claims, 10 Drawing Sheets

312

LOW-POWER ACTIVE MATRIX DISPLAY WITH ROW AND/OR DATA DRIVER ENERGY RECYCLING TECHNIQUES

CROSS-REFERENCE TO OTHER APPLICATIONS

This disclosure claims priority from U.S. Provisional Patent Application No. 63/421,701 filed Nov. 2, 2022, which is hereby incorporated by reference.

FIELD

The disclosure is generally directed at electronic displays and, more specifically, at systems and methods for providing energy recycling techniques to an active matrix display.

BACKGROUND

As the use of technology continues to increase, the number of different innovations to improve electronic device operation have also increased. With many electronic devices, such as televisions, monitors, tablets and other similar products, the device allows information or content to be shown on the electronic device via a display. With respect to displays for portable devices, current versions experience many problems such as high power consumption with a limited battery size; experiencing a large intrinsic capacitive load of row and data lines when the display is used with a higher resolution and/or increased dynamic power consumption with the increase in the resolution or refresh rate of the portable display. As such, the battery life of these portable devices suffers due to these problems.

To increase the battery life of a portable device, one solution is to decrease the power consumption of the display as it represents a considerable portion of the total power consumption in portable devices. On the other hand, as the resolution of the display increases, the capacitive load of the data lines and row lines also increases. As a result, the dynamic power consumption of data and row buffers increases significantly.

Therefore, there is provided novel methods and systems for providing energy recycling techniques for an active matrix display.

SUMMARY

The disclosure is directed at a method and system for reducing power and/or energy consumption of electronic displays. In one embodiment, the disclosure is particularly suitable for displays such as, but not limited to, micro-displays for Near To Eye (NTE) applications or displays for portable devices, such as, but not limited to, cellphones, tablets, and laptop computers, where limited energy is stored on a battery. The disclosure is directed at energy recycling techniques that reduce the dynamic power consumption of the data and/or row drivers which, results in an increased battery life.

In the current disclosure, different and novel energy recycling techniques are discussed. These embodiments may be classified into three categories: 1) recycling energy from a row line to a row line, 2) recycling energy from a data line to a data line, and 3) recycling energy between row lines and data lines.

The row line to row line and data line to data line energy recycling techniques taught below, individually or in combination, reduce the dynamic power consumption of the row and data line's buffer.

In one aspect of the disclosure, there is provided

DESCRIPTION OF THE DRAWINGS

Some embodiments of the present disclosure are illustrated as an example and are not limited by the figures of the accompanying drawings, in which like references may indicate similar elements and in which.

DESCRIPTION

The disclosure is directed at a method and system of energy recycling for low-power displays. Examples of low-power displays include, but are not limited to, low-power active matrix organic light emitting diode (AMOLED) displays. In one embodiment, the disclosure is directed at a low-power display including row and/or data, or column, driver energy recycling techniques or apparatus.

One advantage of the disclosure is that it lowers the power consumption in portable displays by reducing the dynamic power consumption of row and/or data drivers within the display by energy recycling. In one embodiment, the disclosure lowers the power consumption in portable displays by recycling the energy from row line to row line and/or data/column line to data/column line. In other embodiments, energy recycling from data line to data line may be with or without an energy or capacitor bank. In another embodiment, the disclosure lowers power consumption in portable displays by recycling the energy between row lines and/or data lines using a shared or separate energy, or capacitor, bank although other embodiments may not include a capacitor bank.

Figure 1A:
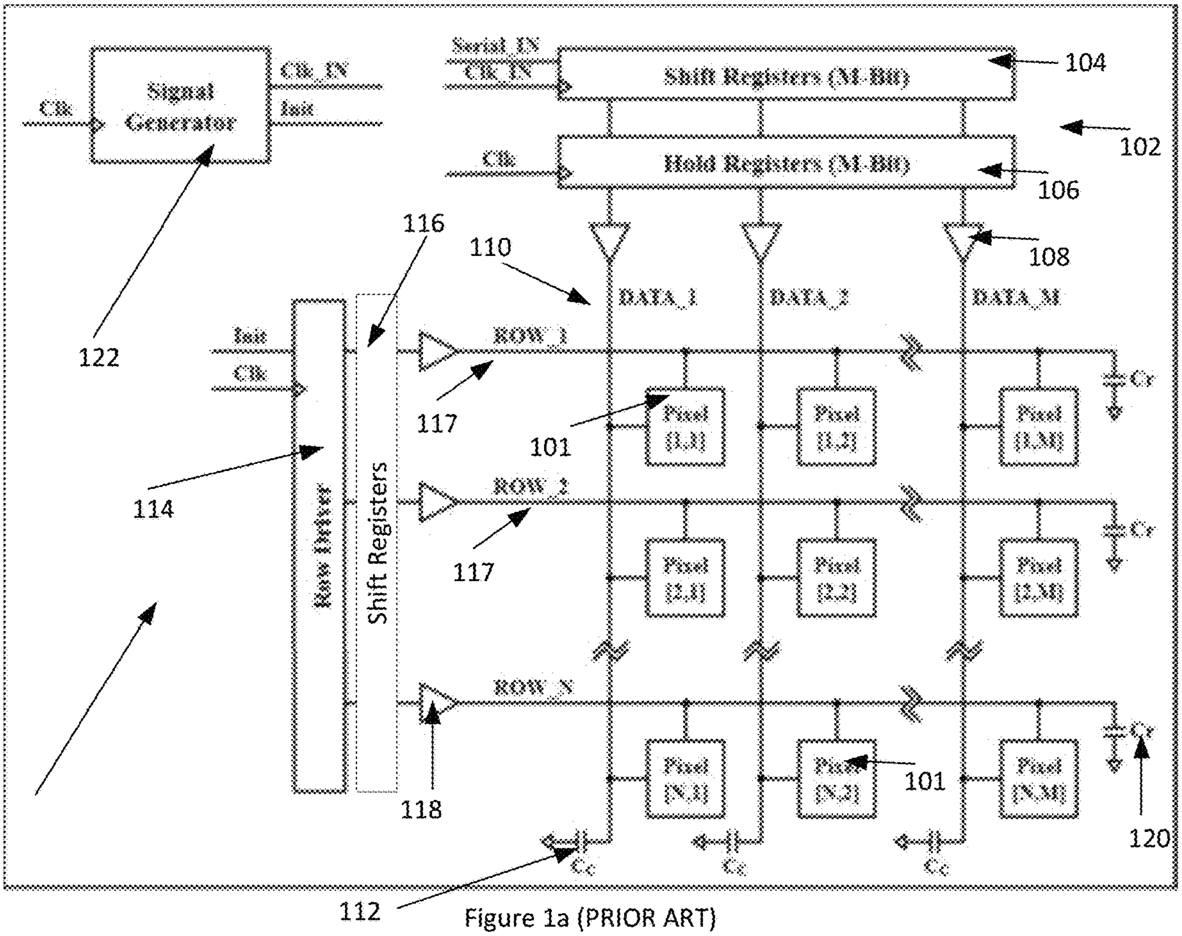
Figure 1a (PRIOR ART)
FIG. 1*a* is a schematic diagram of a conventional N×M AMOLED display and peripheral circuitry is shown.

Turning to FIG. 1*a*, a schematic diagram of a conventional N×M AMOLED display and peripheral circuitry is shown. The display 100 includes a set of pixels 101 that are controlled by a data driver 102 and a row driver 114. The data driver 102 includes a data or column shift register component 104 (including a set of shift registers) and a data or column hold register component 106 (including a set of hold registers). In the current embodiment, the data shift register component 104 and the data hold register component 106 include M shift registers and M hold registers, respectively. The data driver 102 drives a set of M data line buffers 108 (associated with individual data lines 110) that are responsible to charge and discharge the data lines 110 with proper data values. Each data line 110 includes a column capacitor (Cc) 112 that stores the total capacitance of that data line 110. In some embodiments, the total capacitance includes a parasitic capacitance of the data line interconnect and the non-linear capacitance of the drain/source of the access transistors.

The row driver 114 includes a row shift register component 116 (including a set of shift registers) that enables operation of the display 100 one row 117 at a time using individual row buffers 118. In the current embodiment, there are N rows. Each row 117 of the display 100 further includes a row capacitor (Cr) 120 that stores the total capacitance of each row line 117. In one embodiment, the total capacitance of each row includes a parasitic capacitance of the interconnects and a gate capacitance (stored within a gate capacitor) of pixel circuits in the row 117. In one embodiment, the gate capacitor is a non-linear capacitor which changes with the voltages applied to the access transistor's terminals.

A signal generator block 122 generates all control signals required for the operation of the data driver 102 and the row driver 114. In one embodiment, the signal generator block 122 produces a fast clock signal (Clk_IN) for the data shift register component 104 and an initialization signal (Init signal) to start scanning of the display 100.

Figure 1B:
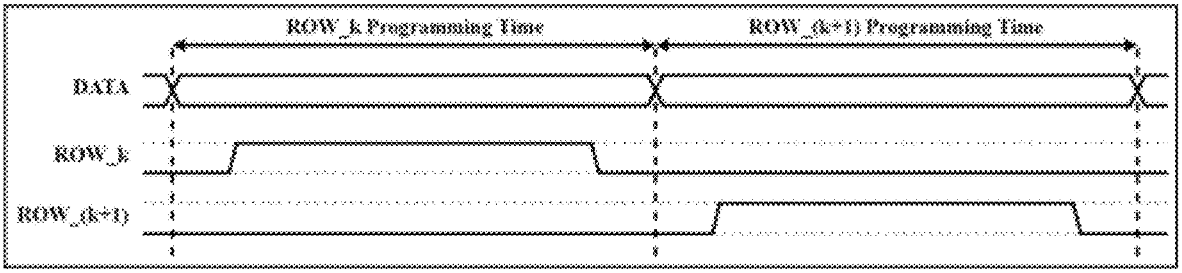
Figure 1b (PRIOR ART)
FIG. 1*b* is a schematic diagram of a timing diagram for the display of FIG. 1*a;*

FIG. 1*b* is a timing diagram of two successive programming times using a pulse width modulation (PWM) driving scheme for the conventional AMOLED display of FIG. 1*a*. During each programming time when the data values are stable on the data lines 110, row operation will be enabled. To enable each row 117, the row buffer 118 associated with that row line 117 charges the row capacitor 120 to $V_{DD}$ via a PMOS transistor (not shown) and then discharges the energy to ground via a NMOS transistor (not shown) of the buffer 118. The size of the row capacitor 120 is proportional to a resolution and pixels per inch (PPI) value whereby a higher row capacitance results in higher dynamic power consumption for that row or row driver.

In order to address the dynamic power consumption the row driver 114, the disclosure includes a charge or energy recycling process. In one embodiment, the charge recycling process uses the energy stored in the individual row capacitors 120 before discharging it to ground. In another embodiment, the charge recycling processes uses the energy stored in the individual column capacitors 112 before discharging it to ground. In other embodiments, the charge recycling process uses the energy stored in both the individual row capacitors 120 and individual column capacitors 112 before discharging it to ground.

Figure 2A:
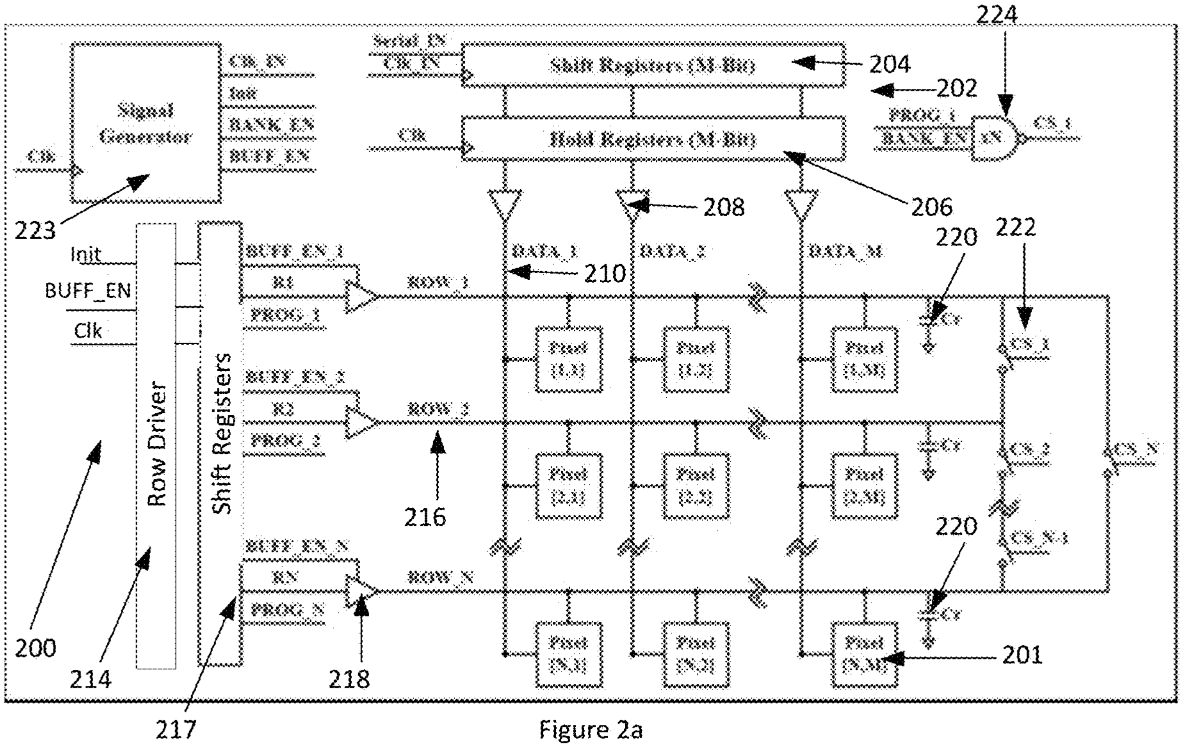
FIG. 2*a* is a schematic diagram of an N×M AMOLED display including a charge recycling technique.

Turning to FIG. 2*a*, a schematic diagram of an N×M AMOLED display including a charge recycling technique implemented via a row to row (or row line to row line) energy recycling methodology is shown. In the current embodiment, the energy recycling is performed on consecutive row lines.

The display 200 includes a set of pixels 201 that are controlled by a data driver 202 and a row driver 214. The data driver 202 includes a data or column shift register component 204 (including a set of shift registers) and a data or column hold register component 206 (including a set of hold registers). In the current embodiment, the data shift register component 204 and the data hold register component 206 include M shift registers and M hold registers, respectively. The data driver 202 drives a set of M data line buffers 208 (associated with individual data lines 210) that are responsible to charge and discharge the data lines 210 with proper data values.

The row driver 214 includes a row shift register component 217 (including a set of shift registers) that enables operation of the display 200 one row 216 at a time using individual row buffers 218. In the current embodiment, there are N rows. Each row 216 of the display 200 further includes a row capacitor (Cr) 220 that stores the total capacitance of each row line 216. In one embodiment, the total capacitance of each row includes a parasitic capacitance of the interconnects and a gate capacitance (stored within a gate capacitor) of pixel circuits in the row 216. In one embodiment, the gate capacitor is a non-linear capacitor which changes with the voltages applied to the access transistor's terminals.

The display 200 further includes a set of in-between row switches 222 that are located between adjacent rows 216 with one of the set of in-between row switches connecting the first row (Row 1) and the last row (Row N) to complete one cycle. In the current embodiment, the set of in-between row switches 222 may be a PMOS switch although other implementations of a switch such as, but not limited to, a transmission gate, are also contemplated.

The display 200 further includes a set of NAND gates 224 (associated with each of the row switches 222) that generate enable signals for the corresponding switches 222. In the current embodiment, each row can be seen as an acceptor of energy during one programming time and then as a donor of energy in another programming time.

A signal generator block 223 generates all control signals required for the operation of the data driver 202 and the row driver 214. Similar to the conventional display embodiment of FIG. 1*a*, the signal generator block 223 produces a fast clock signal (Clk_IN) for the data shift register component 204 and an initialization signal (Init signal) to start scanning of the display 200. In the current embodiment, the signal generator block 223 generates two extra signals (seen as a buffer enable signal (BUFF_EN) and a row bank enable signal (BANK_EN)).

The signals from the row driver 214 include a PROG_i signal (where i is the row number) which represents an output of the row driver's shift register for each specific row. The PROG_i signal is enabled during the whole programming time of that row. Using the BUFF_EN signal along with the PROG_i signals, the row driver 214 generates and/or transmits a specific or predetermined BUFF_EN_i signal for each row buffer 218. Based on the enable signals, each row line 216 is isolated from the supply voltage and ground during specific time slots within the programming time. In one embodiment, the programming time may be seen as the time window in which new data is written into pixels in a given row. To generate enabling signals for the inset of in-between switches 222, the NAND gate 224 associated with each row 216, NANDs the BANK_EN signal with the PROG_i signal to create or generate the enable signal for each switch 222.

Figure 2B:
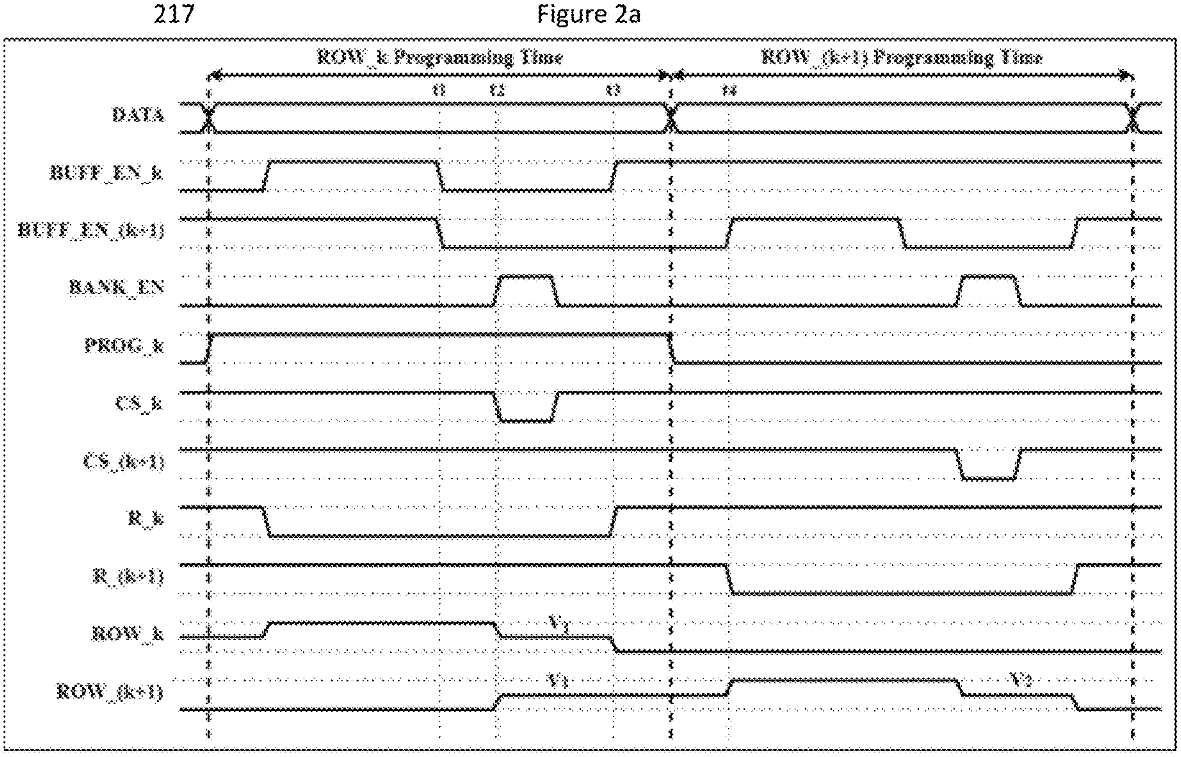
FIG. 2*b* is a timing diagram for the display of FIG. 2*a;*

Turning to FIG. 2*b*, a timing diagram of the control, data, and row signals of successive rows, at time t1 for the display of FIG. 2*a* is provided. For the timing diagram, it is understood or assumed that the pixels of the $k^{th}$ row have been already programmed with proper data values and that the row enable signal (ROW_k) may be disabled. Since a portion of energy is recycled before discharging to ground, at time t1, the buffers of both, or successive, lines ($k^{th}$ and $(k+1)^{th}$) are disconnected from the supply voltage and ground. At time t2, CS_k signal is '0' and the PMOS switch 222 between the $k^{th}$ row (the energy donor row) and $(k+1)^{th}$ row (the energy acceptor row) is on which allows for charge sharing between the fully charged row capacitor 220 of the $k^{th}$ row and the row capacitor 220 of the $(k+1)^{th}$ row which is at voltage zero.

As a result of this charge sharing, the final voltage of both row capacitors 220 is $V_1$. As discussed above, the capacitance for each row capacitor 220 may include two components, one of which is a non-linear capacitor associated with the access transistors' gate that changes with the voltage on the transistor terminals. This non-linear capacitor is at its maximum, or a high, size or value if the gate voltage is at $V_{DD}$ and the other terminals are at 0V. It is at its minimum, or a low, size or value if the gate voltage is 0 and all other terminals are at 0V. This is due to the change in the channel capacitance of the transistor. As a result, the energy donor row has a higher average capacitance compared to the energy acceptor row during the charge sharing time slot and the final voltage is more than half of the $V_{DD}$ voltage.

At time t3, the energy buffer 218 of the donor row ($k^{th}$ row) is enabled and the rest of the energy on the capacitor 220 of the $k^{th}$ row is discharged to ground. It is noted that the buffer of the energy acceptor row ($(k+1)^{th}$ row) is still disabled at t3. At time t4, the buffer of the $(k+1)^{th}$ row is enabled and its row capacitor is fully charged to $V_{DD}$ via the PMOS transistors in the buffer 218. This process is then repeated for the remaining rows in the display 200 (thereby providing an energy recycling process within the display).

In some embodiments, applying this process or technique to the row driver reduces more than half of the dynamic power consumption of the row buffers.

In order to test the row to row energy recycling methodology or embodiment described above, the energy recycling technique was simulated on a video graphics array (VGA) display in TSMC 65 nm technology with a refresh rate of 60 Hz and a pulse width modulation (PWM) driving method. The PWM may be weighted or unweighted. Considering the energy consumption needed to generate the controlling signals, the overall power consumption of the row driver was reduced by 36% on average for different test images. It was noted that applying the same technique on a display with a higher resolution, PPI, and refresh rate resulted in a higher percentage reduction in the overall (static and dynamic) power consumption. Because the ratio of the dynamic power consumption to the static power consumption is higher in displays with higher specifications, reducing the dynamic power consumption by half has a higher significance on the overall power consumption.

In another embodiment, the charge recycling technique may be implemented via a column to column (or data line to data line) energy recycling methodology or apparatus. As the data driver may be the most power-hungry block or component in the peripheral circuitry of the display, test results have shown that, based on the image content, the power consumption of the data driver could be four to twelve times larger than the power consumption of the row driver. Also, the overall capacitance of a data line increases with an increase in the resolution and PPI of the display. The data line to data line energy recycling described below addresses some of these disadvantages by reducing the dynamic power consumption of the data driver.

Figure 3A:
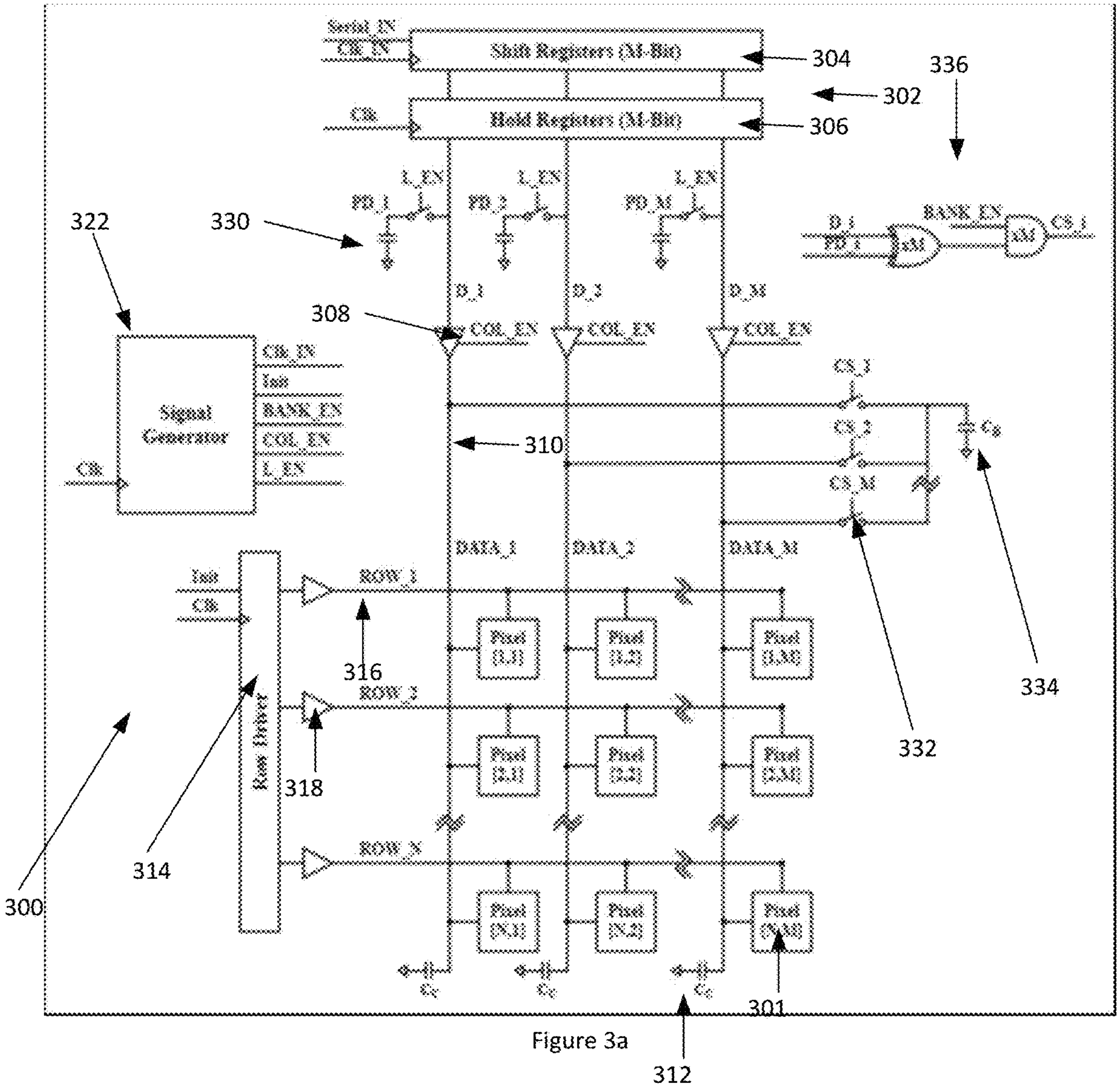
FIG. 3*a* is a schematic diagram of another embodiment of an N×M AMOLED display including a charge recycling technique.

Turning to FIG. 3*a*, an N×M AMOLED display including a charge recycling technique implemented via a column to column (or data line to data line) energy recycling methodology or apparatus is shown. In the current embodiment, the energy recycling is performed on consecutive data lines, however, in other embodiments, the energy recycling technique may be executed, performed or implemented on any or between any two data lines.

The display 300 includes a set of pixels 301 that are controlled by a data driver 302 and a row driver 314. The data driver 302 includes a data or column shift register component 304 (including a set of shift registers) and a data or column hold register component 306 (including a set of hold registers). In the current embodiment, the data shift register component 304 and the data hold register component 306 include M shift registers and M hold registers, respectively. The data driver 302 drives a set of M data line buffers 308 (associated with individual data lines 310) that are responsible to charge and discharge the data lines 310 with proper data values. Each data line 310 includes a column capacitor (Cc) 312 that stores or represents the total capacitance of that data line 310. In some embodiments, the total capacitance includes a parasitic capacitance of the data line interconnect and the non-linear capacitance of the drain/source of the access transistors.

The row driver 314 includes a row shift register component 316 (including a set of shift registers) that enables operation of the display 300 one row 316 at a time using individual row buffers 318. In the current embodiment, there are N rows.

To implement the data line to data line energy recycling process, the display 300 further includes a set of DRAM cells 330 to store the previous value of the data and a transmission gate (acting as a switch 332) to connect the column capacitor 312 of a data line 310 to a capacitor bank (CB) 334. The display 300 further includes a circuit 336 that generates a charge sharing signal for enabling and disabling the individual transmission gates 332. In one embodiment, the circuit 336 may be a combination of XOR and AND gates. In some embodiments, there may not be a capacitor bank (CB) 334.

A signal generator block 322 generates all control signals required for the operation of the data driver 302 and the row driver 314. Similar to the conventional display embodiment of FIG. 2*a*, the signal generator block 322 produces a fast clock signal (Clk_IN) for the data shift register component 304 and an initialization signal (Init signal) to start scanning of the display 300. In the current embodiment, the signal generator block 322 also generates a capacitor bank enable signal (BANK_EN), a column enable signal (COL_EN) and a DRAM enable signal (L_EN) signal.

For each programming time, a data line 310 is connected to the capacitor bank 334 in two scenarios. The first scenario occurs when the previous data on the data line 310 is '1' and the new data is '0' which means that the energy on the column capacitor 312 for that data line 310 is going to be discharged to ground. In response to this, a portion of energy is stored on or in the capacitor bank 334 and the rest of the energy is then discharged to the ground. In this scenario, the net energy is transferred from the data line 310 to the capacitor bank 334.

In the second scenario, the previous data on the data line is '0' and the new data is '1' which means that the data line 310 receives some energy from the capacitor bank 334 and is then fully charged to $V_{DD}$ using the supply voltage.

For scenarios where the data value for a data line is not changing between two programming times (or time cycles), that data line is not connected to the capacitor bank 334 and holds its value.

Figure 3B:
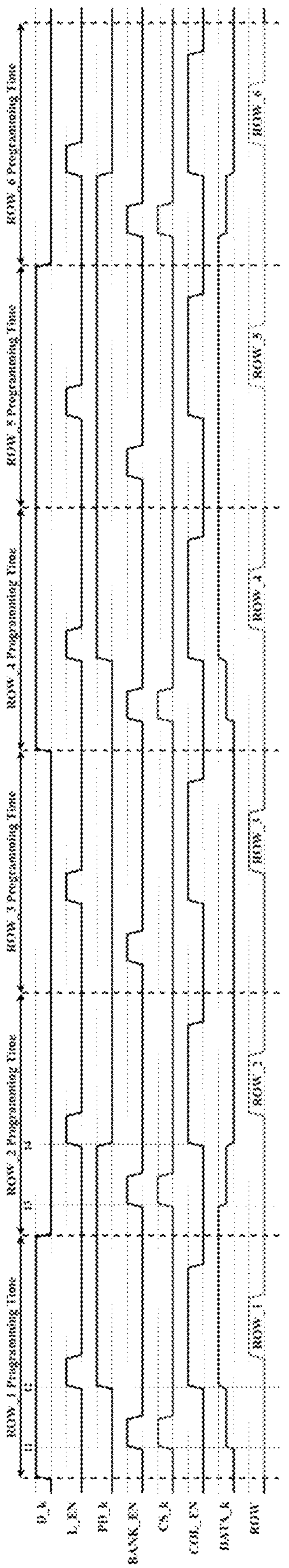
FIG. 3*b* is a timing diagram for the display of FIG. 3*a;*

Turning to FIG. 3*b*, a timing diagram showing control, row, and data signals for six (6) consecutive programming times is shown. Each programming time may be seen as the programming time for the display to cycle through a row, whereby the first programming time relates to actions being performed by row one, the second programming time relates to actions being performed by row two, the third programming time relates to actions taken or performed by row 3 and so on. The timing diagram shows the programming times of the $k^{th}$ data line, assuming a data sequence of "0100110". For ease of understanding, the DRAM's enable signal (L_EN) is enabled for each programming time and stores the data on a small capacitor that is used in the next programming time as the previous data (PD_k).

At the beginning of the first programming time (t0), the buffer for the $k^{th}$ data line is disconnected from the supply voltages and the data value is 0. At time t1, the new data value (D_k) is '1' and the previous data value (PD_k) is '0', whereby the data line's XOR gate output (on circuit 336) is '1'. Since the bank enable signal (BANK_EN) is enabled at time t1 and the output of the XOR is '1', at that time the data line's charge sharing signal (CS_k) is enabled and the transmission switch 330 for the $k^{th}$ data line turns on to connect it to the capacitor bank 334 to receive energy from the capacitor bank 334. During this charge sharing interval, all data lines 310 where previous and new data values are different will be connected to the capacitor bank 334 at the same time. Those data lines that had a previous value of '1' are seen as donors of energy to the capacitor bank and those data lines that had a previous value of '0' are seen as acceptors of energy from the capacitor bank or other data lines.

At time t2, the new data value is stored in the DRAM cell for comparison in the next programming cycle. Since the COL_EN signal is enabled, the column capacitor of the $k^{th}$ data line is fully charged to $V_{DD}$ via the PMOS transistors in the data line's buffer 308. At time t3, the previous data value is '1' and the new data is '0' whereby the data line is connected to the capacitor bank to donate a portion of its energy. The data line or column capacitor for the data line is fully discharged at time t4 when the data line's buffer 308 is enabled.

At the charge sharing interval of the $3^{rd}$ programming time, the previous and new data values are both '0' such that the data line is not connected to the capacitor bank. Later, for $4^{th}$ programming time, the data line receives energy from the capacitor bank and holds the value of '1' at the charge sharing interval for the $5^{th}$ programming time since the previous data value and the new data value are both '1'. Finally, at the charge sharing interval of $6^{th}$ programming time, since the new data value is '0', the data line donates a part of the energy in its column capacitor to the capacitor bank and then fully discharges.

In some embodiments, SRAM may be used instead of DRAM to store the data values. In yet other embodiments, the XOR component may be implemented via transmission gates instead of CMOS logic. Also, although the current embodiment includes a transmission gate switch, in other embodiments, a switch such as, but not limited to, a MOS transistor may be used.

In experiments to test the data line to data line energy recycling process, the amount of dynamic power reduction is data-dependent. For test images similar to a checkerboard or black and white horizontal lines, the highest energy saving is achieved since the data alters between the data values of '0' and '1' at each programming cycle. Therefore, the disclosure may be more beneficial based on the knowledge about the nature of images and the display's application. For example, in some embodiments, the circuitry or components that perform the charge recycling may be disconnected from the supply voltage if the image is still and does not change for several frames or if the nature of the image introduces limited changes in each data line for the next upcoming frames.

In experimentation, the data driver energy recycling technique was simulated on a VGA display in TSMC 65 nm technology with a refresh rate of 60 Hz and the PWM driving method. The results showed that the dynamic power consumption of the data line buffer was reduced by half. Considering the energy consumption of the introduced energy recycling circuitry and the rest of the data driver (i.e., the shift and hold register components), the overall power consumption of the data driver was reduced by about 16% on average for 10 test images with different data activity percentages. As discussed above, since the data driver is the most power-hungry module in peripheral circuities, applying the data driver energy recycling technique reduces the overall power consumption of the whole display's drivers (including the static and dynamic power consumption of the row driver, data driver, and signal generator) by 15% on average. The data driver or data line energy recycling technique or method of the disclosure is particularly beneficial for high data activity display images where it may reduce the power consumption of the data driver up to 25% during power and/or energy-hungry image applications.

Figure 4:
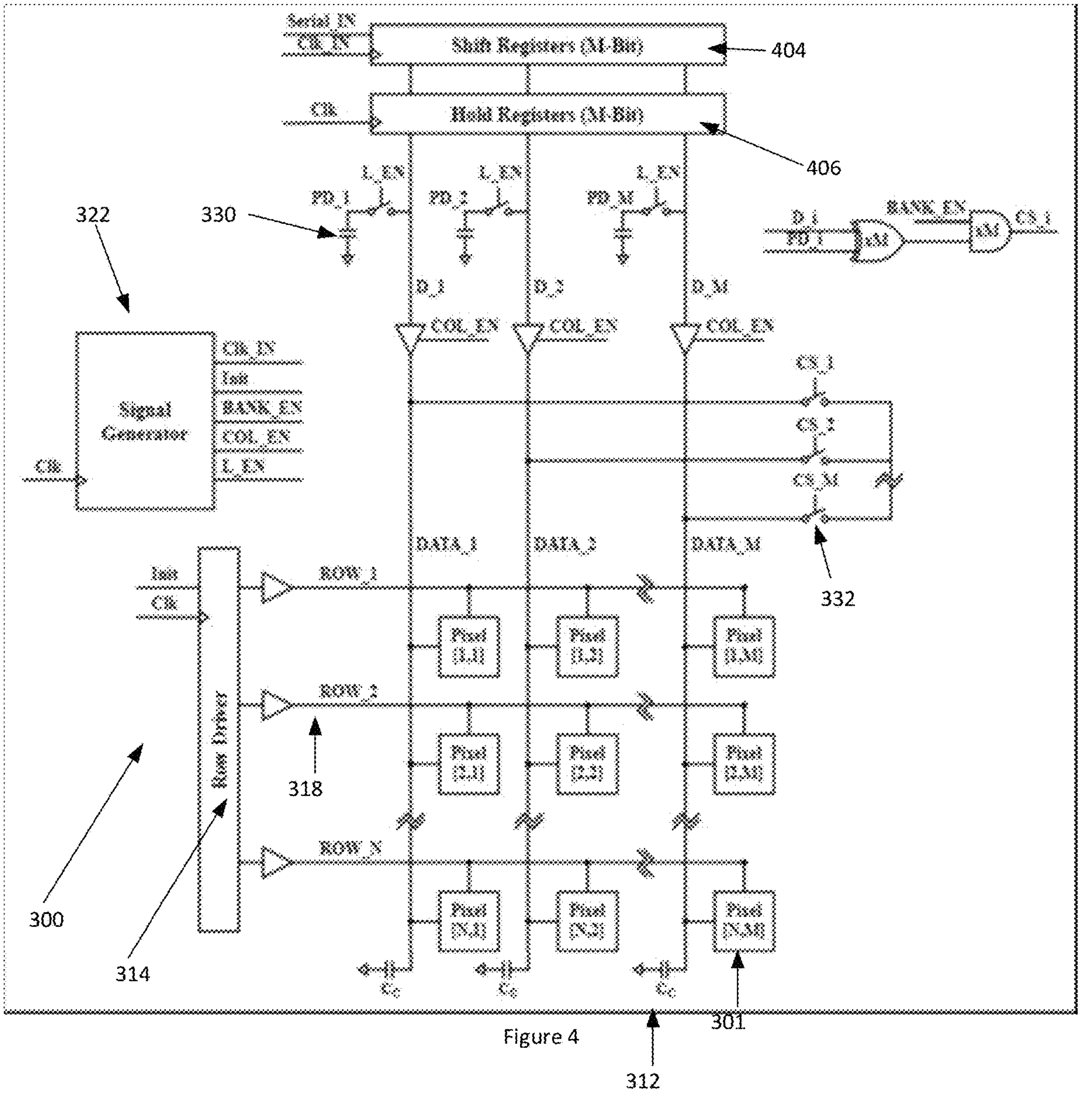
FIG. 4 is a schematic diagram of another embodiment of an N×M AMOLED display including a charge recycling technique.

In another embodiment, the data driver energy recycling technique could be also implemented without the capacitor bank as shown in the schematic diagram of FIG. 4. The embodiment of FIG. 4 is the same as the embodiment of FIG. 3*a* minus the capacitor bank 334. Since there is no capacitor bank, the energy exchange is between two consecutive programming times or time cycles. All data lines whose data value changes from '1' to '0' are donors of energy to the data lines whose data values are changing from '0' to '1'.

Depending on the display's application, the technique may be applied without the extra capacitor bank to avoid the area overhead of the capacitor bank. As such, the embodiment of FIG. 4 may provide an improved display for images or test images with a random data pattern. This is due to the fact that between each two programming times, several data lines are available as donors and acceptors and no charge will be shared (or wasted) with the capacitor bank. In experimentation it was observed that the overall power consumption of the data driver was reduced by 18% on average for 10 test images with different data activity percentages. However, for specific data patterns like a black and white horizontal pattern, at the end of each programming time (or time cycle), all data lines are either donors or acceptors at the same time. Since there is no energy bank (or capacitor bank) to store the energy when all data line values change from '1' to '0', there is no energy to provide for the data lines next time that they need some energy.

In another embodiment, energy recycling between row lines and energy recycling between data lines may be implemented within a single display. In this embodiment, the row driver energy recycling process and one of the data driver energy recycling processes may be combined in a single display to reduce the overall dynamic power consumption of the display. Each recycling process may or may not be used with a capacitor bank depending on a desired design of the display. In other embodiments, such as the one shown in FIG. 5, a single capacitor or energy bank may be shared between the row lines and the data lines. In this embodiment, energy recycling or sharing may be enabled between a row line and a data line or, in other words, between the row driver and the data driver.

Figure 5:
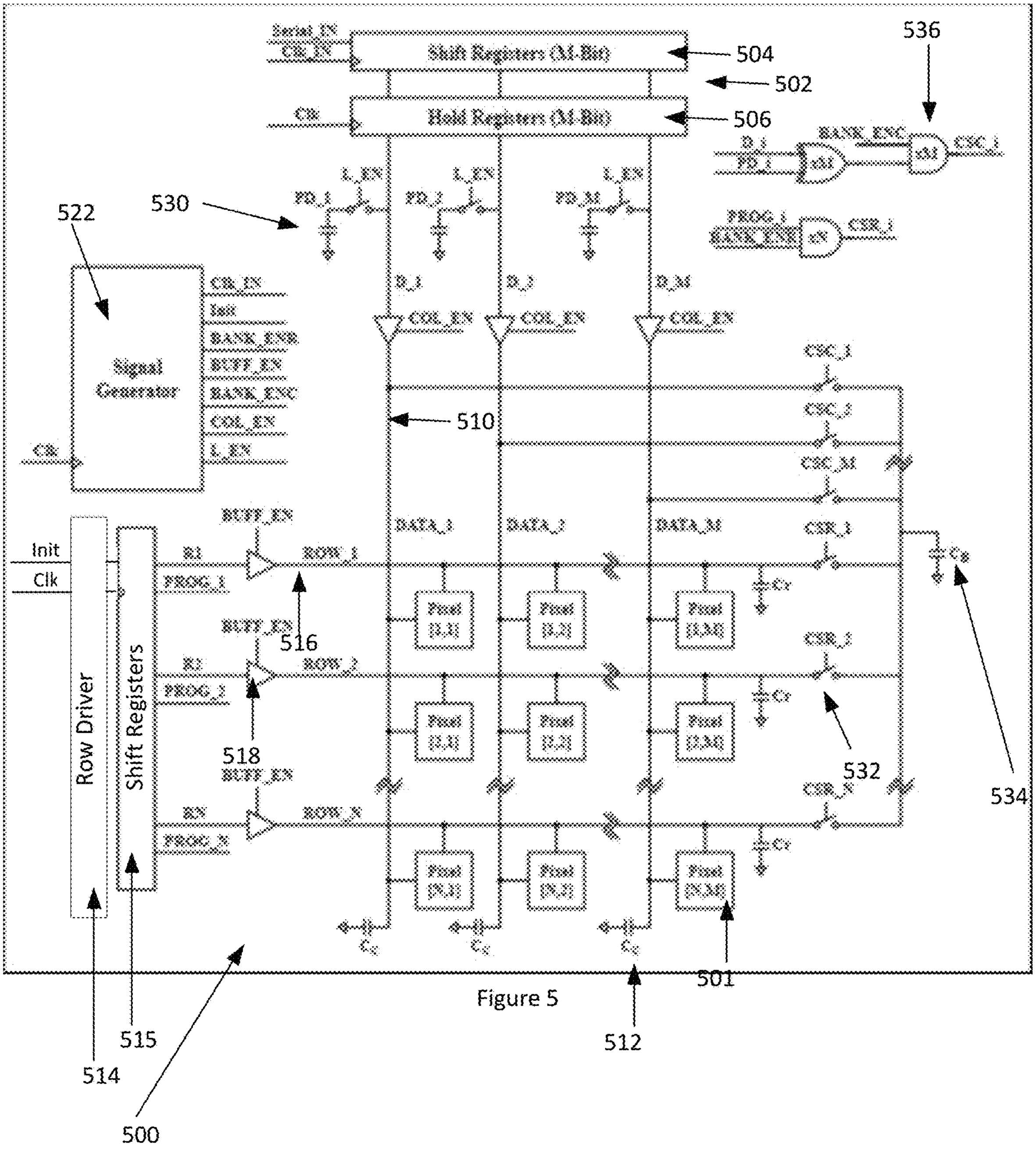
FIG. 5 is a schematic diagram of another embodiment of an N×M AMOLED display including a charge recycling technique.

Turning to FIG. 5, yet another embodiment of a display including energy recycling components is shown. The display 500 includes a set of pixels 501 that are controlled by a data driver 502 and a row driver 514. The data driver 502 includes a data or column shift register component 504 (including a set of shift registers) and a data or column hold register component 506 (including a set of hold registers). In the current embodiment, the data shift register component 104 and the data hold register component 506 include M shift registers and M hold registers, respectively. The data driver 502 drives a set of M data line buffers 508 (associated with individual data lines 510) that are responsible to charge and discharge the data lines 110 with proper data values. Each data line 510 includes a column capacitor (Cc) 512 that stores the total capacitance of that data line 510. In some embodiments, the total capacitance includes a parasitic capacitance of the data line interconnect and the non-linear capacitance of the drain/source of the access transistors.

The row driver 514 includes a row shift register component 515 (including a set of shift registers) that enables operation of the display 500 one row 516 at a time using individual row buffers 518. In the current embodiment, there are N rows. Each row 516 of the display 500 further includes a row capacitor (Cr) 520 that stores the total capacitance of each row line 516. In one embodiment, the total capacitance of each row includes a parasitic capacitance of the interconnects and a gate capacitance (stored within a gate capacitor) of pixel circuits in the row 516. In one embodiment, the gate capacitor is a non-linear capacitor which changes with the voltages applied to the access transistor's terminals.

The display 500 further includes a set of in-between row switches 532 that are located between adjacent rows 516 with one of the set of in-between row switches connecting the first row (Row 1) and the last row (Row N) to complete the cycle. In the current embodiment, the set of in-between row switches 532 may be a PMOS switch although other implementations of a switch such as, but not limited to, a transmission gate, are also contemplated.

The display 500 further includes a set of NAND gates (associated with each of the row switches 532) that generate enable signals for the corresponding switches 532. In the current embodiment, each row can be seen as an acceptor of energy during one program time and then as a donor of energy in the subsequent programming time.

To implement the data line to data line energy recycling process, the display 500 further includes a set of DRAM cells 530 to store the previous value of the data; a transmission gate (acting as a switch 532) to connect the column capacitor 512 of a data line 510 to a capacitor bank (CB) 534. In the current embodiment, the capacitor bank is connected to each of the data lines and the row lines. The display 500 further includes a circuit 536 that generates a charge sharing signal for enabling and disabling the individual transmission gates 532. In one embodiment, the circuit 536 may be a combination of XOR and AND gates.

A signal generator block 522 generates all control signals required for the operation of the data driver 502 and the row driver 514. In the current embodiment, the signal generator block 522 produces a fast clock signal (Clk_IN) for the data shift register component 504 and an initialization signal (Init signal) to start scanning of the display 500. The signal generator block 522 also generates a capacitor bank enable signal (BANK_ENC), a column enable signal (COL_EN), a buffer enable signal (BUFF_EN), a row bank enable signal (BANK_ENR)) and a DRAM enable signal (L_EN) signal. In the current embodiment, the signal generator block 222 generates two extra signals (seen as a buffer enable signal (BUFF_EN) and a row bank enable signal (BANK_EN)).

In some embodiments, the row energy recycling and the data energy recycling apparatus may operate independently from each other. In other embodiments, operation of the row and data energy recycling apparatus may be combined.

Based on the nature of the images that are being shown on the display, the system may select either row driver energy recycling, data driver energy recycling or a combination of row driver and data driver energy recycling to reduce the dynamic power consumption. In some embodiments, the desired energy recycling to be used based on the images being displayed to automate selection of the recycling technique or techniques to be used, enabled or implemented.

The energy recycling between row lines and data lines using a shared capacitor bank was simulated on a VGA display in TSMC 65 nm technology with a refresh rate of 60 Hz and the PWM driving method. In experiments, it was shown that the overall power consumption of the display's drivers (including the static and dynamic power consumption of the row driver, data driver, and signal generator) was reduced by about 20% on an average.

Combining row driver energy recycling with data driver energy recycling within the same display provides an energy recycling architecture that benefits from the dynamic power consumption reduction on both row and data drivers.

Figure 6:
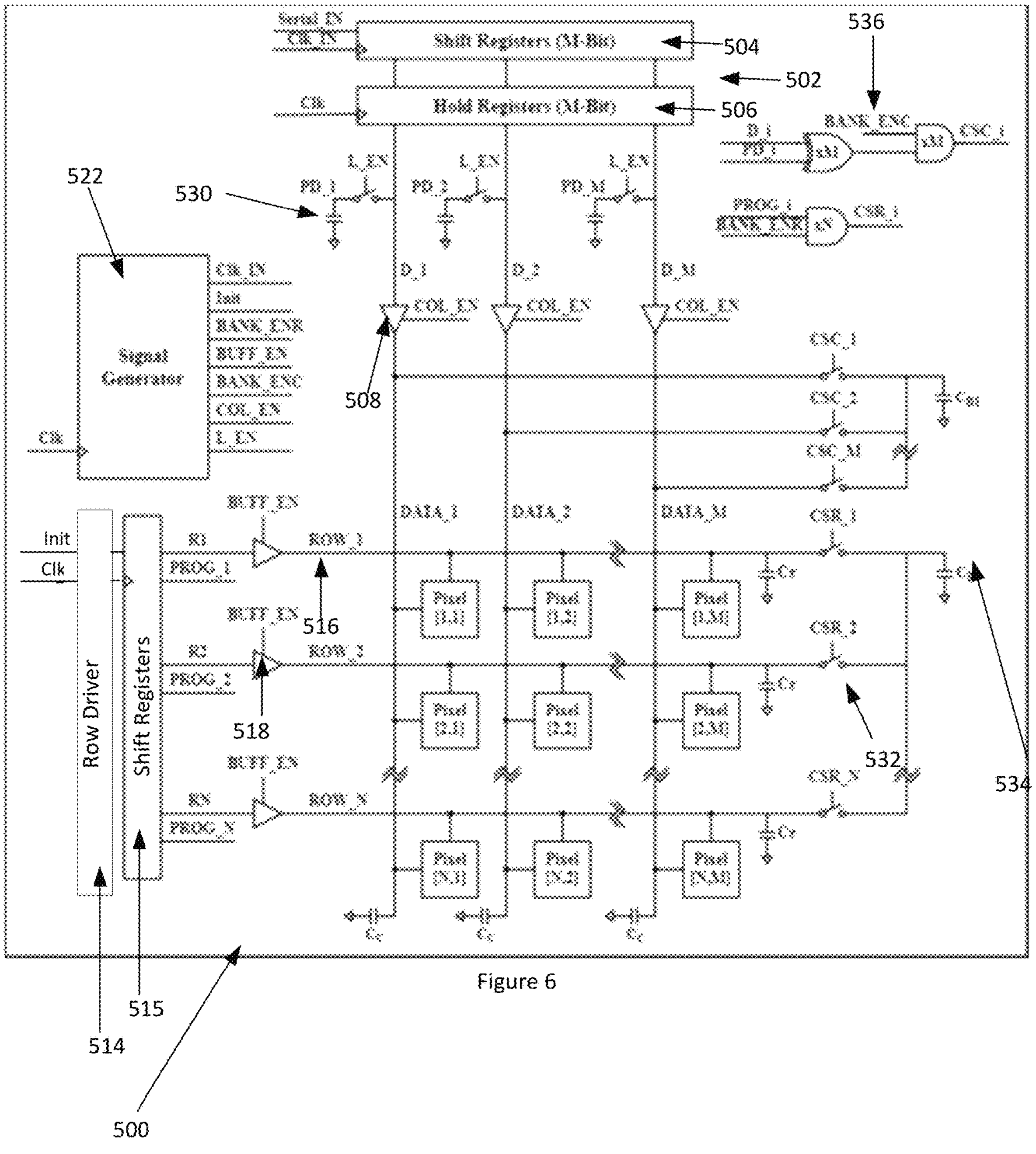
FIG. 6 is a schematic diagram of another embodiment of an N×M AMOLED display including a charge recycling technique.

Turning to FIG. 6, another embodiment of a display with row energy recycling and data driver energy recycling components is shown. The embodiment of FIG. 6 is similar to the embodiment of FIG. 5 with the inclusion of data line capacitor bank for data energy recycling and a row line capacitor bank for row energy recycling. Operation of the embodiment of FIG. 6 is discussed above.

Figure 7:
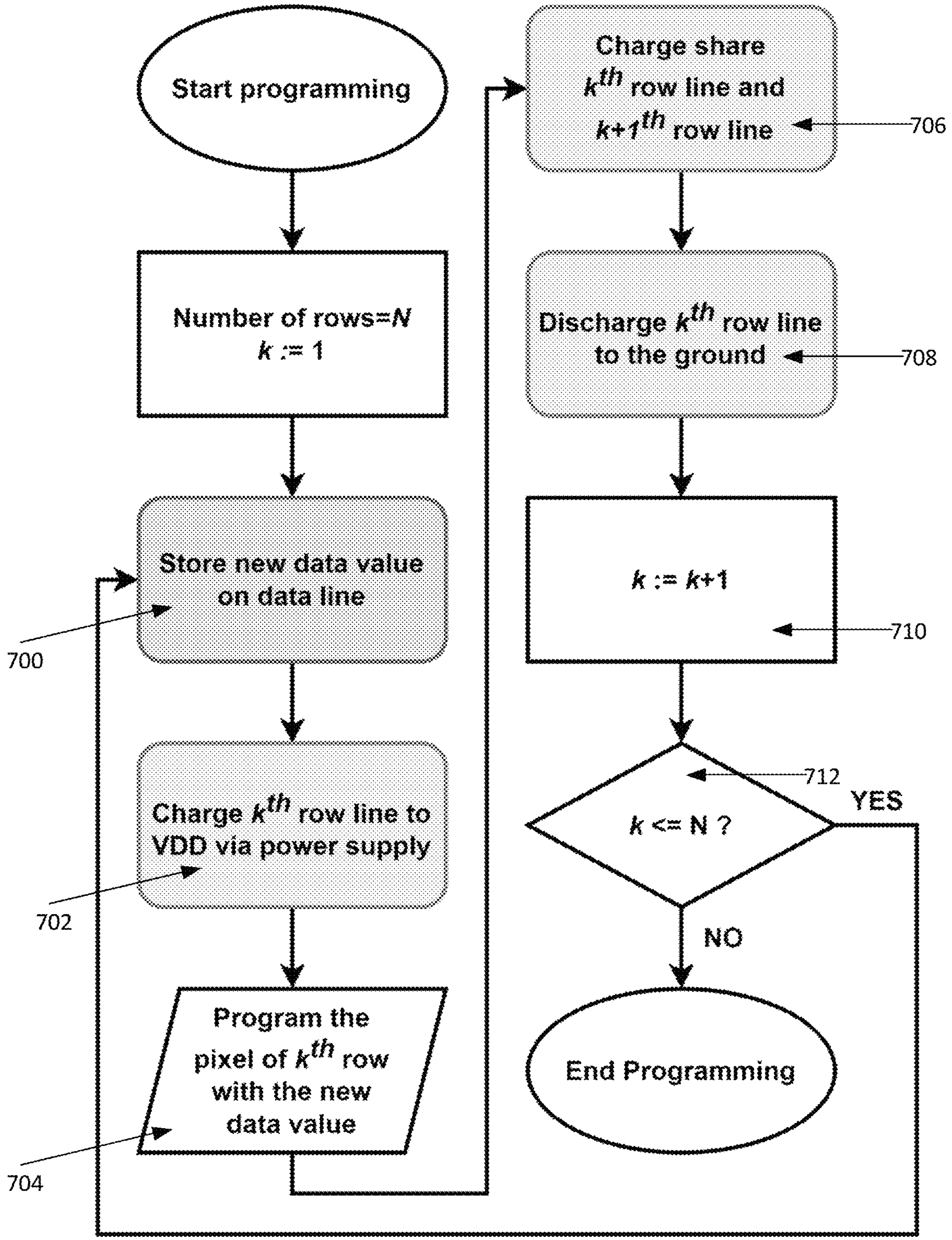
FIG. 7 is a flowchart showing a method of power and/or energy recycling for a display.

Turning to FIG. 7, a flowchart showing a method of row by row energy recycling for a low-power active matrix display is shown. For simplicity, it is assumed that the display is an N×M display with a number of rows equal to "N" and a number of data lines equal to "M", however, the flowchart of FIG. 7 focusses on a single data line. The letter "k" represents the row that is donating the energy for energy recycling with "k" initially set to "1" or the first row.

The flowchart of FIG. 7 shows one embodiment of a scanning and energy recycling process for a single column (or data line) of the display. It should be noted that the programming or operation for each column or data line is independent from the programming or operation of other columns and may be performed in parallel. The row energy recycling described in the current flowchart may apply to any of the "M" data lines.

Initially, a new data value is stored on a data line (700). For example, the data line may change from a "0" to a "1" or from a "1" to a "0". If the data value does not change from one programming time to the next programming time, the system waits for the next programming time to check if a new data value has been stored on the data line. As understood, the data line passes each of the rows in the display (as schematically shown in each of the embodiments of FIG. 2*a*, FIG. 3*a* or any one of FIGS. 4 to 6).

After the new data value is stored on the data line, the $k^{th}$ (which initially is the $1^{st}$) row that intersects with the data line is charged to $V_{DD}$ via the power supply (702). The pixel associated with the intersection of the data line and the $k^{th}$ row is then programmed with the new data value (704).

A charge share is then initiated between the $k^{th}$ row line and the $(k+1)^{th}$ row line (706). This may be performed such as described above with respect to FIGS. 2*a* and 2*b*. It is understood that in other embodiments, the charge share may be between the $k^{th}$ row line and any of the other row lines. After the energy recycling has been completed, the $k^{th}$ row line is then discharged to ground (708). The value of k is then increased by 1 (710). A check is then performed to determine if the updated value of k<=N (712). If the updated value of k is less than or equal to N, the method returns to (700) to perform (700) to (712) for the next row (K+1). In the current embodiment, if the energy sharing is being performed between adjacent or consecutive rows, if k is equal to N, the energy sharing is then between the $N^{th}$ row and the $1^{st}$ row such that the energy sharing is performing in a cyclical manner. If the updated value of k is greater than N, the method is deemed complete for the current scanning cycle of the display.

Figure 8:
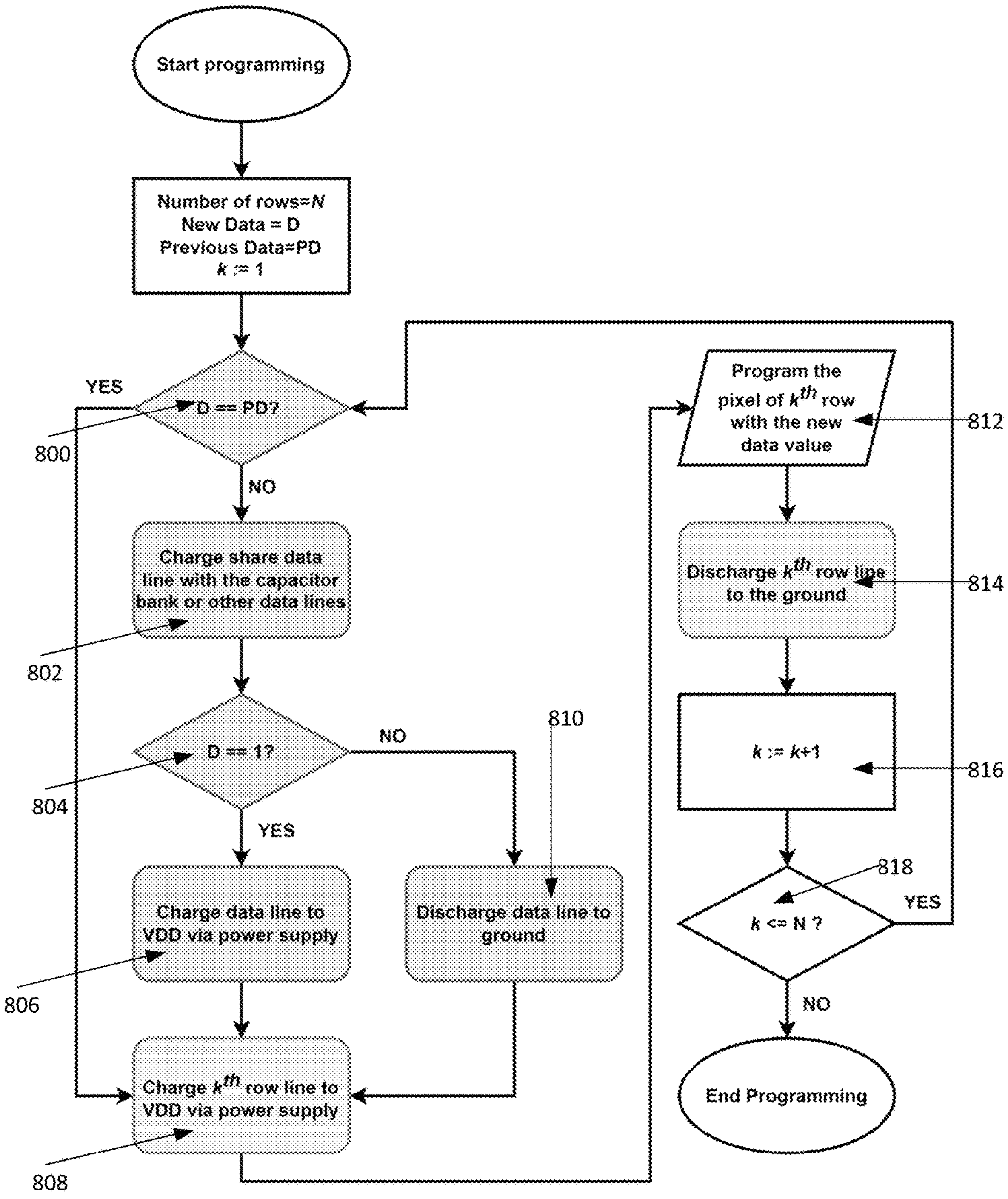
FIG. 8 is a flowchart showing another method of power and/or energy recycling for a display.

Turning to FIG. 8, a flowchart showing a method of data line to data line energy recycling is provided. The flowchart of FIG. 8 represents a full scanning of pixel circuits for a single column or data line. Although only described with respect to one data line, the method of FIG. 8 is the same for each of the columns or data lines in the display. In the current embodiment, the display is an N×M display that has "N" rows and "M" columns. For simplicity, the new data on the data line is represented by D and the previous data on the data line is represented by PD with k representing the row number. Initially, k is set to 1 although it is understood that the data energy recycling can be started on any row but for ease of explanation, the current description starts at row 1.

Initially, a check is performed to determine if the new data is equal to the previous data (800). In other words, a check is performed to determine if D is the same as PD. If the new data is not equal to the previous data, the data line performs data line energy recycling (such as taught above) with the capacitor bank or other data lines (802) depending on the implementation of the display.

A further check is then performed to determine if D=1 (804). If D=1, the data line is charged to $V_{DD}$ via the power supply line (806) and the $k^{th}$ row line is charged to $V_{DD}$ via the power supply (808). If D does not equals 1, or D=0, the data line is discharged to ground (810) and the $k^{th}$ row line is charged to $V_{DD}$ via the power supply (808).

Going back to 800, if the new data is equal to the previous data, in other words the new data is the same as the previous data, the data line holds its value and the $k^{th}$ row line is charged to $V_{DD}$ via the power supply (808). After charging the $k^{th}$ row (808), the pixel associated with the intersection of the $k^{th}$ row line and data line is programmed with the new data (D) value (812) or if D=PD, the pixel holds its value. The $k^{th}$ row line is then discharged to ground (814). The value of k is then updated by one to (k+1) (816). A check is performed to determine the new value of k (or K=1) is less than or equal to N (818). If so, the process returns to (800) and is repeated. If not, scanning by the display is considered to be completed and the display awaits the next programming cycle.

Figure 9:
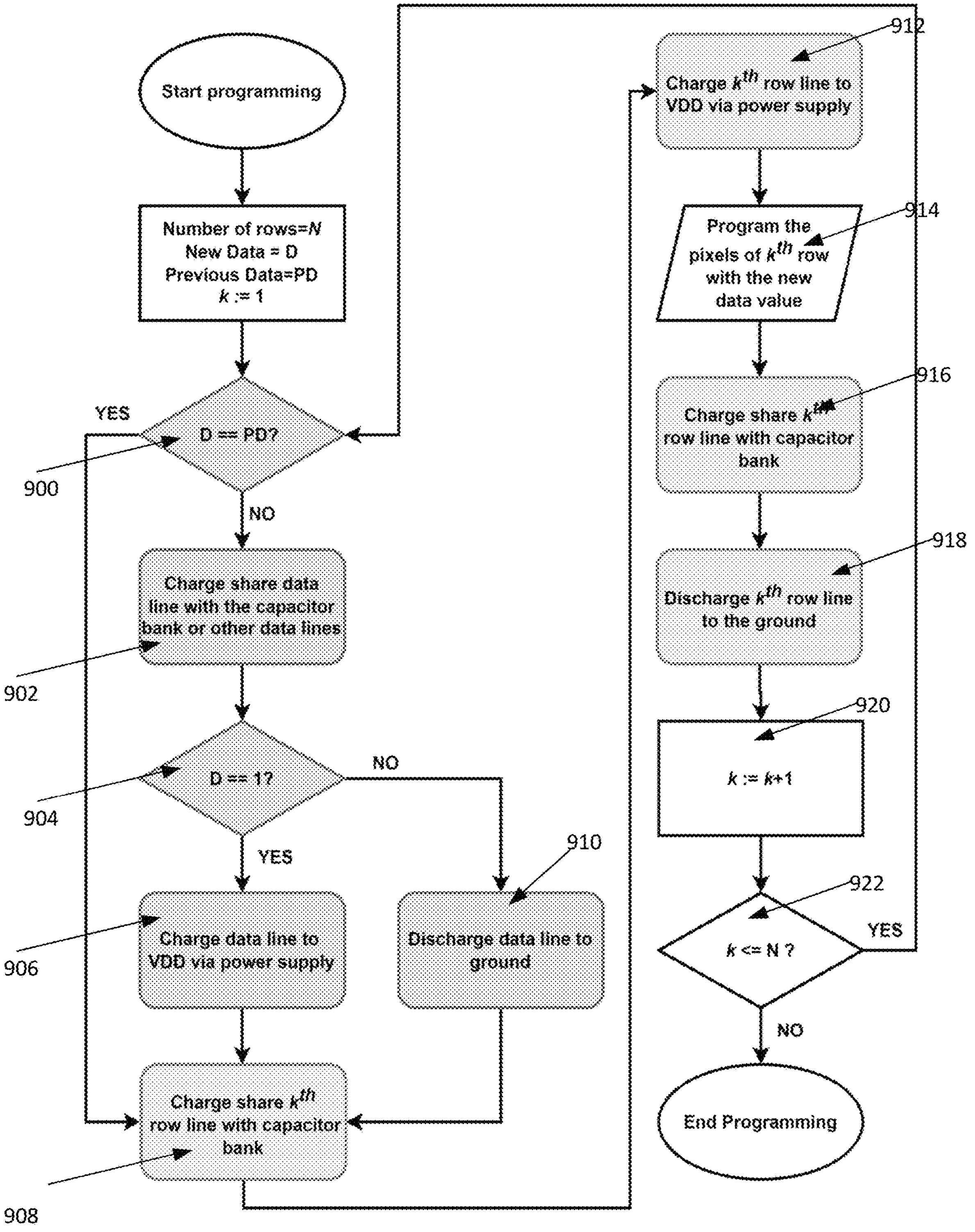
FIG. 9 is a flowchart showing yet another method of power and/or energy recycling for a display.

FIG. 9 provides a flowchart of a further method of energy recycling where row and the data line energy recycling techniques are combined. In the method of FIG. 9, the display has N rows and M data lines. The new data is represented by D, the previous data represented by PD and k is the row number (initially set to 1). The flowchart represents the scanning of pixels on a single column in the display. It will be understood that the same method may be performed on the other data columns. The data line energy recycling for each of the data lines may be performed in sequence or in parallel with each other.

Initially, a check is performed to determine if the new data that has been applied to the data line is equal to the previous data (900) on the data line. In other words, a check is performed to determine if D==PD. If the new data is not equal to the previous data, the data line charge shares with the capacitor bank or other data lines (902). The sharing by the data line with the capacitor bank or other data lines depends on the implementation of the display such as taught about.

A further check is then performed to determine if D==1 (904). If D==1, the data line is charged via the power supply line (906) and the $k^{th}$ row line charge shares with the capacitor bank (908) to receive any charge that has been previously stored in the capacitor bank. If D does not equal 1, the data line is discharged to ground (910) and the $k^{th}$ row line charge shares with the capacitor bank (908) to receive any charge that has been previously stored in the capacitor bank. If the new data is equal to the previous data as checked in (900), the $k^{th}$ row line charge shares with the capacitor bank (908) to receive any charge that has been previously stored in the capacitor bank. In some embodiments, this may the row line's capacitor bank, a capacitor bank that is shared by all row lines or a capacitor bank that is shared with the data lines.

The $k^{th}$ row line is then charged to VDD via the power supply (912). As understood, by charging the $k^{th}$ row with the shared or separate capacitor bank (908) before charging the V' row line to VDD via the power supply (912) provides an energy savings over current systems.

After charging the $k^{th}$ row to VDD, the pixel associated with the intersection of the row line and data line is programmed with the new data (D) value (914). The charge on the $k^{th}$ row line is then shared with the capacitor bank (916) and then discharged to ground (918) and k is then updated to k+1 (920). A check is performed to determine if k is less than or equal to N (922). If so, the process returns to (900). If not, the display's scanning is considered to be completed until the next programming cycle.

In some embodiments, in order to enable writing of new data, a row line (and its associated capacitance) is charged to VDD which turns on all access transistors in the pixel circuits on the row and in order to disable the writing of new data, the energy stored on the row capacitor is discharged to ground. Similarly, to write data high, a data line (and its associated capacitance) is charged to VDD. After successfully writing the data in the pixel, energy stored in the data line is discharged to ground. In one embodiment of the disclosure, before discharging the capacitor, a portion of the energy is stored, such as in a capacitor bank, or is transferred to another line capacitor. Therefore, in use, the disclosure enables other lines to be partially charged to VDD through charge sharing and requiring less energy from the power supply.

Advantages of the disclosure include, but are not limited to, energy recycling between row lines to reduce the dynamic energy consumption; energy recycling between data lines using an external capacitor bank to reduce the dynamic power consumption of the driver; energy recycling between data lines based on the previous and new data values of each data line; data driver's energy recycling between two consecutive programming times without a capacitor bank; energy recycling between data and row drivers using a shared capacitor bank; energy recycling between data and row drivers using separate capacitor bank and energy exchange between row driver and data driver to reduce the dynamic power consumption.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A system for recycling energy in an active matrix display comprising:

an array of pixels, the array of pixels arranged in an N×M configuration where N represents a number of pixel rows and M represents a number of pixel columns;

a set of data lines, each data line associated with an individual pixel column;

a set of row lines, each row line associated with an individual pixel row;

a set of row capacitors, each row capacitor associated with one of the set of row lines;

a set of switches, each switch associated with one of the set of row lines;

a capacitor bank connected to each of the set of row lines for storing charge from one of the set of capacitors and sharing the charge with another of the set of capacitors; and a signal generator for generating and transmitting a switch enable signal to at least one of the set of switches to isolate its associated row line for a period of time whereby, during the period of time, charge stored in the row capacitor associated with a same row line is passed from the associated row line to a row capacitor of another row line of the set of row lines.

2. The system of claim 1 wherein the another row line of the set of row lines is connected to the associated row line via the switch associated with the associated row line.

3. The system of claim 1 further comprising a data driver for driving each of the set of data lines.

4. The system of claim 1 further comprising a row driver for driving each of the set of row lines.

5. A method of row line energy recycling for an N×M active matrix display comprising:

storing new data on a data line;

generating a row switch enable signal for a row switch to isolate a row line associated with the row switch;

sharing charge stored in a row line capacitor associated with the row line associated with the row switch with another row line within the N×M active matrix;

repeating the generating and sharing for each row line that intersects with the data line until the generating and sharing has been performed on each row within the N×M active matrix.

* * * * *